US 11,325,143 B2

(12) United States Patent
Brochier et al.

(10) Patent No.: US 11,325,143 B2
(45) Date of Patent: May 10, 2022

(54) POWDERING SYSTEM

(71) Applicant: EXEL INDUSTRIES, Epernay (FR)

(72) Inventors: Hervé Brochier, Froges (FR);
Jean-Christophe Serpillon, Quet en Beaumont (FR); Michel Fossaceca, Vaulnaveys-le-Haut (FR); Eric Ghio, Champagnier (FR)

(73) Assignee: EXEL INDUSTRIES, Épernay (FR)

( * ) Notice: Subject to any disclaimer, the term of this patent is extended or adjusted under 35 U.S.C. 154(b) by 0 days.

(21) Appl. No.: 16/583,164

(22) Filed: Sep. 25, 2019

(65) Prior Publication Data

US 2020/0101475 A1    Apr. 2, 2020

(30) Foreign Application Priority Data

Oct. 1, 2018  (FR) ........................................ 1859056
Oct. 1, 2018  (FR) ........................................ 1859057

(51) Int. Cl.
*B05B 7/14*       (2006.01)
*B05B 15/52*      (2018.01)
(Continued)

(52) U.S. Cl.
CPC .......... *B05B 7/1454* (2013.01); *B05B 7/1472* (2013.01); *B05B 7/1477* (2013.01);
(Continued)

(58) Field of Classification Search
None
See application file for complete search history.

(56) References Cited

U.S. PATENT DOCUMENTS 7,005,159 B2     2/2006  Ciarelli et al.
2002/0150677 A1* 10/2002  Morita .................. B05B 7/1472
                                              427/180

(Continued)

FOREIGN PATENT DOCUMENTS

EP    2374546 A1   10/2011
EP    2588244 B1   10/2015
(Continued)

OTHER PUBLICATIONS

French Patent Application No. 18 59056, Rapport de Recherche Préliminaire, dated May 28, 2019, 2 pp.
(Continued)

*Primary Examiner* — Jethro M. Pence
(74) *Attorney, Agent, or Firm* — Soquel Group, LLC

(57) ABSTRACT

A powdering system, having a working configuration and a cleaning configuration and including a powder reservoir, including a supply chamber receiving powder; a sprayer, including a powder applicator, and a cleaning inlet, fluidly connected to the supply chamber such that, in the cleaning configuration, a cleaning air supply source can be connected to the cleaning inlet so as to circulate cleaning air in the supply chamber, wherein the powder reservoir includes a discharge opening, arranged through a wall of the supply chamber and opening into the supply chamber, and a movable plug, which is movable between a closing position, in the working configuration, and an open position, in the cleaning configuration, such that the circulation of cleaning air causes residual powder to be discharged through the discharge opening.

21 Claims, 4 Drawing Sheets

Figure 1:
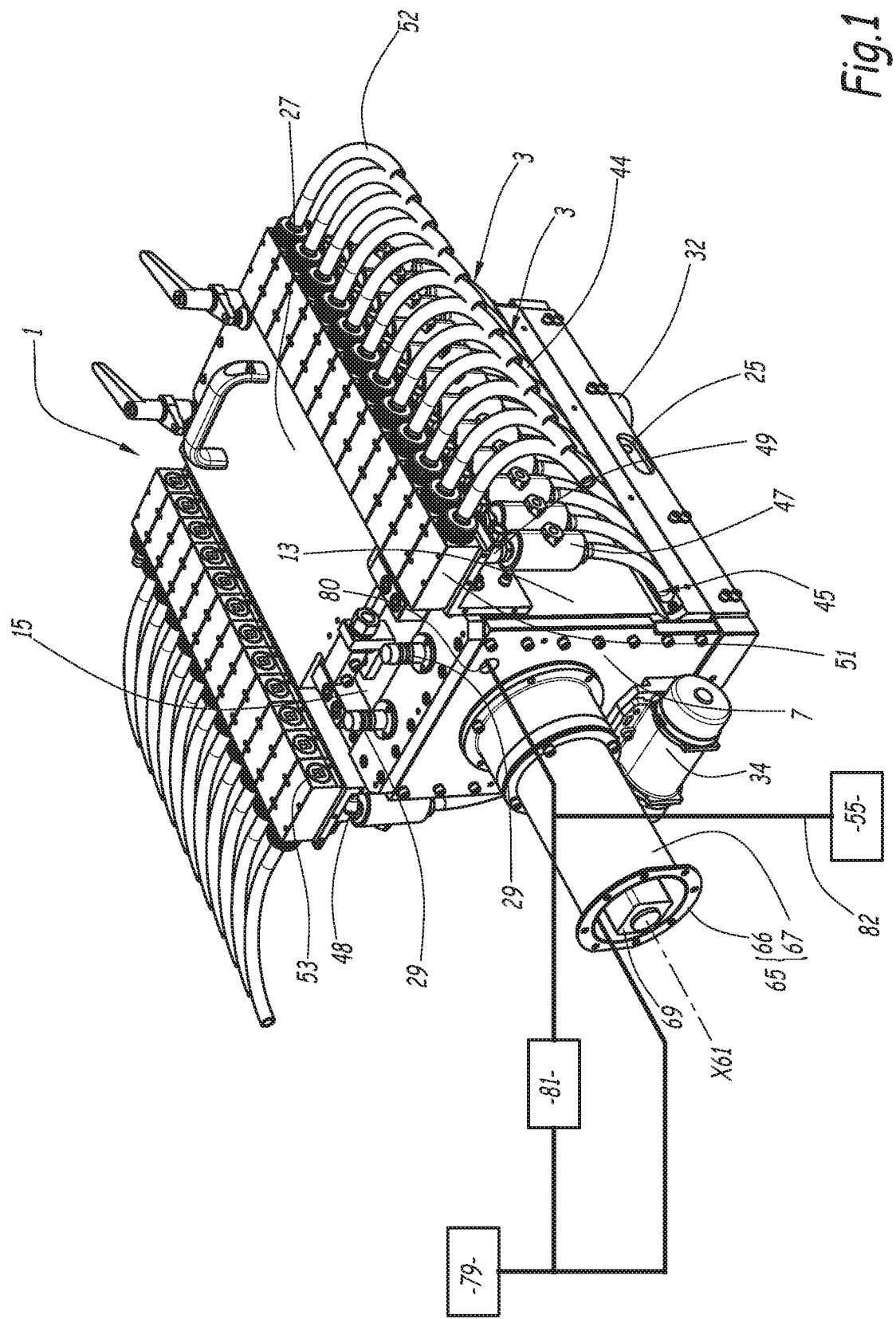

(51) Int. Cl.
  *B05C 19/04*  (2006.01)
  *B05C 19/00*  (2006.01)
  *B05C 19/06*  (2006.01)

(52) U.S. Cl.
  CPC ............ *B05B 15/52* (2018.02); *B05C 19/008* (2013.01); *B05C 19/04* (2013.01); *B05C 19/06* (2013.01)

(56) References Cited

U.S. PATENT DOCUMENTS

| | | | | |
|---|---|---|---|---|
| 2003/0038192 A1* | 2/2003 | Shutic | ................ | B05B 16/25 239/690.1 |
| 2019/0111445 A1* | 4/2019 | Lutz | ................ | B05B 12/006 |

FOREIGN PATENT DOCUMENTS

| | | |
|---|---|---|
| WO | 2005046887 A2 | 5/2005 |
| WO | 2006033813 A2 | 3/2006 |
| WO | 2011128288 A1 | 10/2011 |
| WO | 2012003314 A1 | 1/2012 |
| WO | 2015157099 A1 | 10/2015 |
| WO | 2017186355 A1 | 11/2017 |

OTHER PUBLICATIONS

French Patent Application No. 18 59057, Rapport de Recherche Préliminaire, dated May 22, 2019, 2 pp.

* cited by examiner

POWDERING SYSTEM

CROSS-REFERENCE TO RELATED APPLICATION

This application claims priority of (i) French Patent Application No. 18 59056, filed on Oct. 1, 2018, and (ii) French Patent Application No. 18 59057, filed on Oct. 1, 2018.

FIELD OF THE INVENTION

The present invention relates to a powdering system.

The invention relates to the field of powdering, for example electrostatic powdering, which comprises applying powder on an object by spraying this powder, in order to coat this object with said powder.

BACKGROUND OF THE INVENTION

EP 2,588,244 B1 describes an electrostatic powdering system comprising a reservoir of powder and powder sprayers designed to coat an object, with powder coming from the reservoir, by spraying said powder on the object. The implemented powder is suitable for imparting a color to the coated object. Each powder sprayer comprises a respective supply line, which connects the sprayer to the reservoir, the line comprising a pump for extracting the powder from the reservoir and spraying it. In the reservoir, the powder is placed in a fluidized state owing to a fluidization plate, which is porous and located in the lower part of the reservoir. The reservoir comprises a new powder inlet for filling thereof. During the spraying of the powder, a substantial portion of the powder is not deposited on the object to be coated. This powder is recovered and reintroduced into the reservoir by a second powder inlet. The two powder inlets are located on a vertical side wall of the reservoir, near the bottom. In the same side wall, toward the top, the reservoir also comprises a fluidized air outlet.

During a powder color change, it is necessary to make sure that the reservoir is cleaned of the previous powder that may remain in the reservoir. To that end, compressed air is injected into the reservoir through the powder inlets, the powder being discharged outside the reservoir through the fluidized air outlet, while following an air roll trajectory, owing to the arrangement of the inlets and the outlet.

However, the effectiveness of the cleaning is not always optimal, residual powder being able to remain trapped in certain corners of the reservoir. The cleaning air flow is generally limited by the passage section of the fluidized air outlet, which, most often, is not provided to discharge a substantial quantity of residual powder. However, a modification to the fluidized air outlet with the aim of improving the cleaning function can prove awkward, since the fluidized air outlet must still be able to suitably provide for the discharge of the fluidized air, which is its primary function.

SUMMARY OF THE INVENTION

The invention in particular aims to resolve the aforementioned drawbacks, by proposing a new powdering system, the cleaning of which is more efficient.

To that end, the invention relates to a powdering system, having a working configuration and a cleaning configuration and comprising:
  a powder reservoir, comprising a supply chamber receiving powder;
  at least one sprayer, comprising:
    a powder applicator, and
    a supply line, connecting the powder applicator to a respective supply outlet of the supply chamber, such that, in the working configuration, the powder applicator is supplied with powder contained in the supply chamber by means of the supply line; and
  at least one cleaning inlet, fluidly connected to the supply chamber such that, in the cleaning configuration, a cleaning air supply source can be connected to the cleaning inlet so as to circulate cleaning air in the supply chamber;

According to the invention, the powder reservoir comprises:
  a discharge opening, arranged through a wall of the supply chamber and opening into the supply chamber; and
  a movable plug, which is movable between:
    a closing position of the discharge opening, adopted in the working configuration, and
    an open position of the discharge opening, adopted in the cleaning configuration such that the circulation of cleaning air in the supply chamber through the cleaning inlet causes a discharge of residual powder contained in the supply chamber through the discharge opening, to the outside of the supply chamber.

One idea at the base of the invention is to provide an opening dedicated to discharging residual powder, here the discharge opening. In other words, the sole function of the discharge opening is a cleaning function of the supply chamber, contrary to the prior art, where, for the cleaning, a pre-existing outlet is used, which is therefore not necessarily suitable for this second function. The invention in particular has the advantage of making it possible to provide that the discharge opening has a relatively large passage section, so as to be capable of discharging a significant quantity of residual powder and/or allowing a substantial cleaning air flow rate. It is then advantageously possible to connect a residual powder and cleaning air discharge pipe with a relatively large section. Furthermore, it is easily possible to design the cleaning opening so that it allows complementary equipment in connection with the cleaning, for example cleaning nozzles, whereas other openings having another function might not necessarily be able to receive such complementary equipment.

In the closing position, the plug makes it possible to effectively close the discharge opening so that, in the working configuration, the supply chamber is airtight and powder-tight. To enter the cleaning configuration, it is easy to move the plug to its open position. Furthermore, owing to the plug, it is easily possible to design the discharge opening such that said discharge opening defines a passage section with a large surface area, thus improving the discharge of the cleaning air and the residual powder outside the supply chamber.

Advantageous, but optional features of the invention are defined below:
  the discharge opening defines a cleaning air passage section.
  each cleaning inlet defines a cleaning air passage section.
  the area of the passage section of the discharge opening is greater, preferably at least two times greater, than the sum of the areas of the passage sections of the cleaning inlets.
  said at least one cleaning inlet comprises at least one stationary cleaning nozzle, arranged at the discharge opening while being stationary relative to the wall, said at least one stationary cleaning nozzle being designed to blow cleaning air coming from the supply source from the outside of the supply chamber, toward the inside of the supply chamber, through the discharge opening.

said at least one cleaning inlet comprises at least one movable cleaning nozzle, attached to the movable plug so as to be securely movable with said movable plug, said at least one movable cleaning nozzle being designed to blow cleaning air toward the inside of the supply chamber, through the discharge opening.

from the closing position to the open position, the movable plug is moved toward the inside of the supply chamber.

in the closing position, the movable plug is inserted between each movable cleaning nozzle and the inside of the supply chamber.

in the open position of the movable plug, each movable cleaning nozzle is at least partially positioned inside the supply chamber.

the wall is a vertical wall of the powder reservoir.

the powdering system further comprises a suction system to which the discharge opening is fluidly connected, to thus discharge residual powder contained in the supply chamber toward the suction system, through the discharge opening, when, in the cleaning configuration, cleaning air is circulated in the supply chamber through said at least one cleaning inlet.

the powder reservoir comprises an automatic actuator, automatically positioning the movable plug in the closing position, when the powdering system is in the working configuration, and in the open position, when the powdering system is in the cleaning configuration.

the powder reservoir comprises:
  a fluidization plate, delimiting the supply chamber, the fluidization plate emitting, in the working configuration, fluidization air of the powder contained in the supply chamber; and
  at least one fluidized air outlet arranged through the wall, which is configured to discharge fluidization air in the working configuration, at least one of the cleaning inlets equipping said at least one fluidized air outlet in order, in the cleaning configuration, to circulate cleaning air toward the supply chamber through said at least one fluidized air outlet.

the powder reservoir comprises: an upper wall, the supply chamber being delimited by the upper wall and by the fluidization plate; and at least one side wall, connecting the upper wall to the fluidization plate and bearing the supply outlet of said at least one sprayer, the supply outlet being arranged closer to the fluidization plate than the upper wall, the outlet preferably being located at a distance smaller than 50 mm, for example smaller than 25 mm, from the fluidization plate.

each supply outlet defines an outlet orifice passing through the side wall, each outlet orifice defining an orifice axis that is inclined relative to the fluidization plate, by an angle of between 30° and 60°, preferably between 45° and 55°.

the powder reservoir comprises an outlet for emptying powder contained in the supply chamber, the emptying outlet passing through the fluidization plate.

said at least one side wall comprises a first side wall and a second side wall opposite one another, delimiting the supply chamber between them; and a plurality of sprayers is provided, such that, for each sprayer, the supply line of the concerned sprayer connects the powder applicator of this sprayer to a respective supply outlet of the supply chamber, a first portion of the supply outlets being provided through the first side wall, a second portion of the supply outlets being provided through the second side wall.

the supply chamber comprises at least one inlet for allowing powder into the supply chamber; and said at least one cleaning inlet comprises a line cleaning inlet belonging to the supply line of said at least one sprayer, the line cleaning inlet being arranged between the powder applicator and the supply outlet, such that, in the cleaning configuration, for each sprayer, the cleaning air source can be connected to the line cleaning inlet to circulate cleaning air towards the powder applicator and towards the supply chamber, via the supply line.

the line cleaning inlet comprises a filter by means of which the cleaning air is injected into the supply line, the filter having a pore size smaller than the particle size of the powder, preferably a pore size smaller than 50 μm, for example a pore size smaller than 30 μm.

for each sprayer, the supply line comprises a valve, arranged between the supply outlet and the line cleaning inlet, the valve moving between:

an open configuration, in which the valve allows the circulation of cleaning air coming from the line cleaning inlet toward the supply chamber and toward the powder applicator, and a closed configuration, in which the valve prohibits the circulation of cleaning air coming from the line cleaning inlet toward the supply chamber, while allowing the circulation of cleaning air coming from the line cleaning inlet toward the powder applicator via the supply line.

for each sprayer:

the supply line comprises a pump, arranged between the powder applicator and the line cleaning inlet, and the pump, in the working configuration of the powdering system, circulates powder contained in the supply chamber up to the powder applicator, by means of the supply line.

According to one embodiment that is independent with respect to the invention defined above, there is a powdering system, having a working configuration and a cleaning configuration and comprising:

a powder reservoir, comprising a supply chamber receiving powder and comprising at least one powder intake inlet into the supply chamber; and at least one sprayer, comprising:

a powder applicator; and a supply line, connecting the powder applicator to a respective supply outlet of the supply chamber, such that, in the working configuration, the powder applicator is supplied with powder contained in the supply chamber by means of the supply line.

According to this independent embodiment, the supply line of said at least one sprayer comprises a respective cleaning inlet, arranged between the powder applicator and the supply outlet, such that, in the cleaning configuration, for each sprayer, a cleaning air source can be connected to the cleaning inlet to circulate cleaning air towards the powder applicator and towards the supply chamber, via the supply line.

Owing to this independent embodiment, the powdering system comprises as many cleaning inlets as there are supply lines, which allows quick and effective cleaning, not only of the supply chamber, but also of the supply lines themselves, including the supply outlets. It is advantageously possible to provide that the cleaning air is also circulated through the powder applicator of the supply line whose cleaning inlet receives the cleaning air circulation.

The cleaning air is advantageously compressed air, or any compressed gas mixture, suitable for cleaning powder.

In the independent embodiment, the cleaning is effective, in particular inasmuch as, at the supply lines, the cleaning air follows the same path that the powder would have followed in the working configuration. Each cleaning inlet being arranged along one of the cleaning lines, first the concerned cleaning line is cleaned, the cleaning line being relatively difficult to clean in the prior art. The cleaning can be done effectively, since the circulation of cleaning air is done through each supply outlet, generally located in a lower part of the supply chamber. The cleaning air is circulated in a lower part of the supply chamber, even if the powder intake inlet is located in the upper part of the supply chamber.

Depending on the desired cleaning, using the cleaning air source, it is possible to circulate cleaning air in only one cleaning inlet at a time, in several cleaning inlets at once, or in all of the cleaning inlets at once. Preferably, the cleaning air source is connected to all of the cleaning inlets at the same time, so as to be able to circulate the cleaning air in the desired manner, by selecting one or several cleaning inlets where the cleaning air is circulated. Preferably, to switch between the working and cleaning configurations, it is not mandatory to connect and disconnect the cleaning air source with respect to the cleaning inlets, which facilitates the automation of the cleaning. Indeed, the cleaning inlets advantageously do not have a function other than the intake and/or discharge of cleaning air. It is possible to provide that the cleaning air source blows cleaning air at each cleaning inlet. It is possible to provide that the circulation is done in a pulsed or continuous manner.

Advantageous, but optional features of the independent embodiment are defined below:
- the cleaning inlet comprises a filter by means of which the cleaning air is injected into the supply line.
- the filter has a pore size smaller than the particle size of the powder, preferably a pore size smaller than 50 μm, for example a pore size smaller than 30 μm.
- for each sprayer, the supply line comprises a valve, arranged between the supply outlet and the cleaning inlet, the valve moving between an open configuration, in which the valve allows the circulation of cleaning air coming from the cleaning inlet toward the supply chamber and the powder applicator and a closed configuration, in which the valve prohibits the circulation of cleaning air toward the supply chamber while allowing the circulation of cleaning air toward the powder applicator via the supply line.
- for each sprayer:
  - the supply line comprises a pump, arranged between the powder applicator and the cleaning inlet, and
  - the pump, in the working configuration of the powdering system, circulates powder contained in the supply chamber up to the powder applicator, by means of the supply line.
- the powder reservoir comprises:
  - an upper wall;
  - a fluidization plate, the supply chamber being delimited by the upper wall and by the fluidization plate, the fluidization plate emitting fluidization air of the powder contained in the supply chamber; and
  - at least one side wall, connecting the upper wall to the fluidization plate and bearing the supply outlet of said at least one sprayer, the supply outlet being arranged closer to the fluidization plate than the upper wall, the outlet orifice preferably being located at a distance smaller than 50 mm, for example smaller than 25 mm, from the fluidization plate.
- each supply outlet defines an outlet orifice passing through the side wall, each outlet orifice defining an orifice axis that is inclined relative to the fluidization plate, by an angle of between 30° and 60°, preferably between 45° and 55°.
- the powder reservoir comprises an outlet for emptying powder contained in the supply chamber, the emptying outlet passing through the fluidization plate.
- the powdering system comprises the cleaning air source, fluidly connected to the supply line via the cleaning line, to circulate cleaning air to and/or from the supply chamber, by means of the supply line, when the powdering system is in the cleaning configuration.
- the reservoir comprises a first side wall and a second side wall that are opposite one another, delimiting the supply chamber between them.
- a plurality of sprayers is provided, such that, for each sprayer, the supply line of the concerned sprayer connects the powder applicator of this sprayer to a respective supply outlet of the supply chamber, a first portion of the supply outlets being provided through the first side wall, a second portion of the supply outlets being provided through the second side wall.

BRIEF DESCRIPTION OF THE DRAWINGS

The invention and the independent embodiment will be better understood in light of the following description, showing exemplary embodiments of a powdering system according to the invention, in reference to the appended drawings, in which:

FIG. 1 is a perspective view of a powdering system according to one embodiment according to the invention;

FIG. 2 is a longitudinal sectional view of the powdering system of FIG. 1;

FIG. 3 is a cross-sectional view of the powdering system of the preceding figures, in a working configuration; and FIG. 4 is a cross-sectional view, similar to that of FIG. 3, of the powdering system of the preceding figures, in a cleaning configuration.

DETAILED DESCRIPTION OF THE INVENTION

FIGS. 1 to 4 show a powdering system, including a powder reservoir 1 and a plurality of sprayers 3. The sprayers 3 are partially shown in FIG. 1. Two of the sprayers 3 are schematically shown in each of FIGS. 3 and 4.

Here, twenty-four sprayers 3 are provided for the reservoir 1. In a variant, a number of sprayers 3 different from twenty-four is provided, at minimum a single sprayer 3.

The powdering system changes between a working configuration and cleaning configuration. The cleaning configuration is in particular implemented before the introduction, into the reservoir 1, of a new powder whereof the characteristics, for example a color, are different from those of a residual powder previously contained in the reservoir.

In the working configuration, the powdering system is designed to perform a powdering, preferably an electrostatic powdering, by means of sprayers 3, in order to coat one or several objects, not illustrated, with the powder contained in the reservoir 1. The powder can in particular be used to paint the object in question.

The powder in question is for example a thermosetting resin powder.

The reservoir 1 is advantageously generally parallelepiped. In this case, the reservoir 1 comprises four side walls 7, 9, 11 and 13, which are advantageously vertical during the use of the reservoir 1. These side walls in particular comprise a front side wall 7 and a rear side wall 9, which are opposite and parallel, as well as a left side wall 11 and a right side wall 13, which are opposite and parallel, the side walls 11 and 13 each connecting the walls 7 and 9 to one another. The reservoir 1 also comprises an upper wall 15 and a bottom wall 17, which are opposite and advantageously parallel to one another. At their respective perimeter, the walls 15 and 17 close the side walls 7, 9, 11 and 13, respectively by the top and the bottom.

The reservoir 1 advantageously comprises a plate 19, arranged inside the reservoir 1, as a partition, between the upper wall 15 and the bottom wall 17. The plate 19 is advantageously parallel to the bottom wall 17. At its perimeter, the plate 19 connects the walls 7, 9, 11 and 13. Thus, each side wall 7, 9, 11 and 13 connects the plate 19 to the upper wall 15 and to the bottom wall 17.

Figure 2:
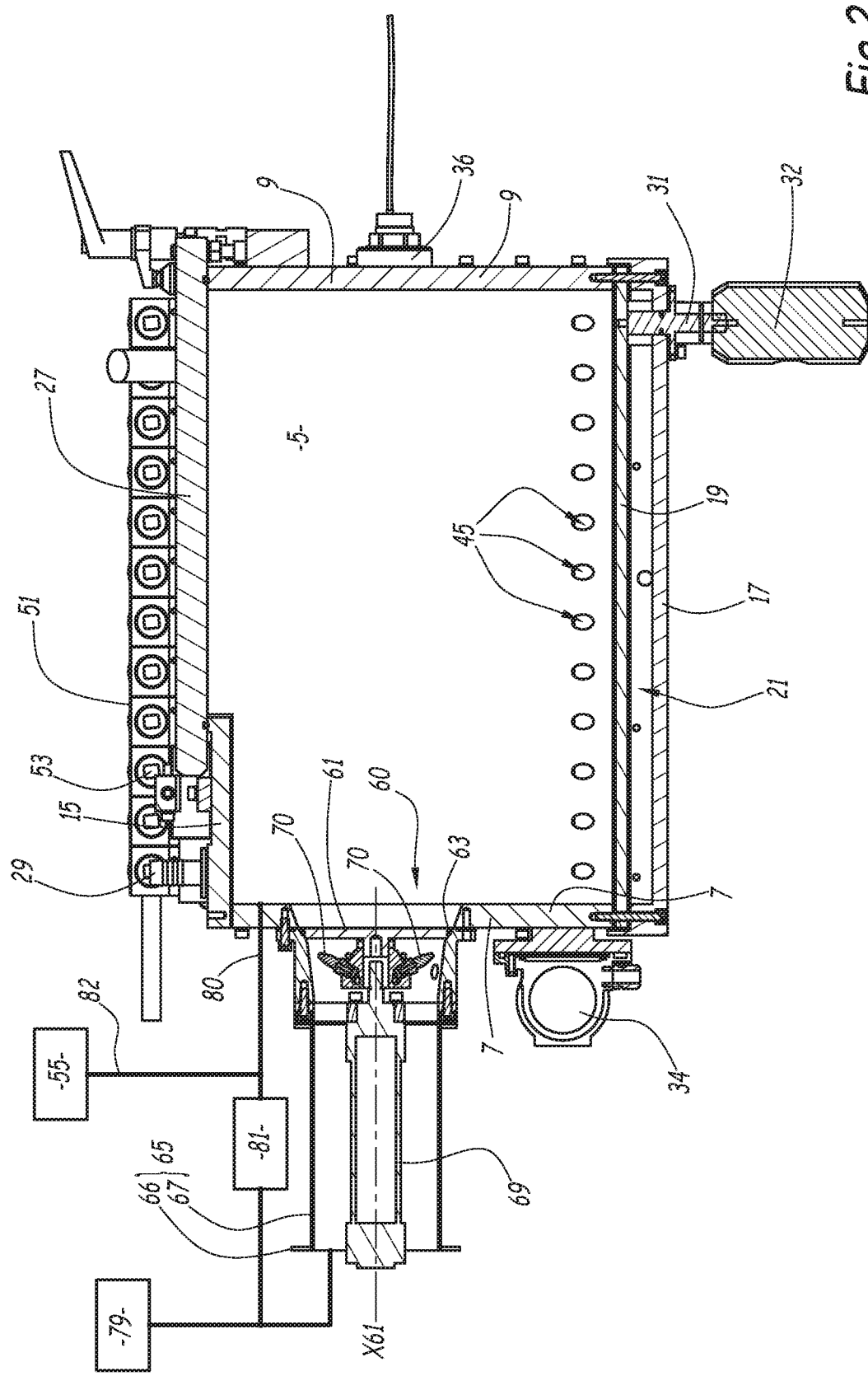
Figure 3:
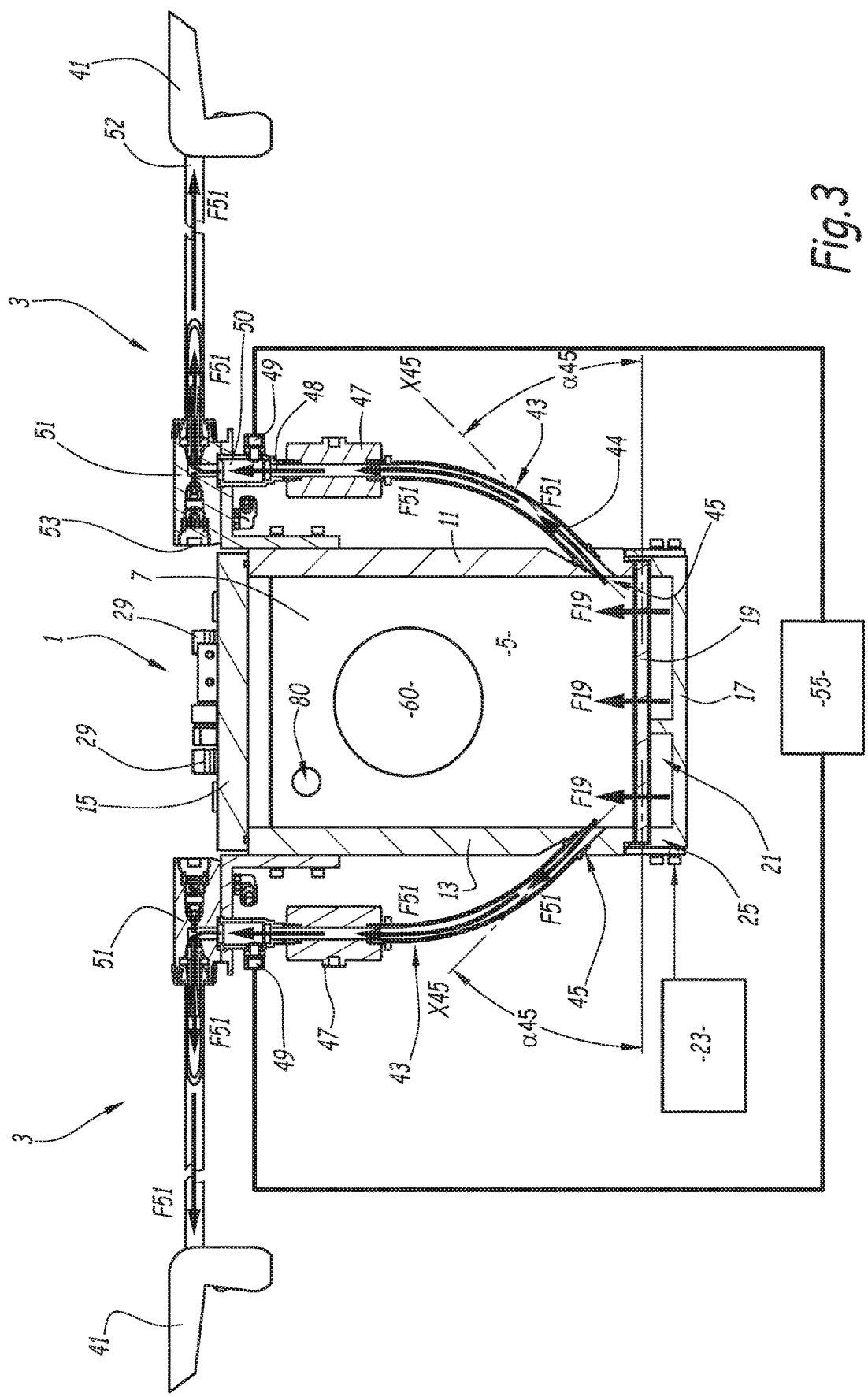
Figure 4:
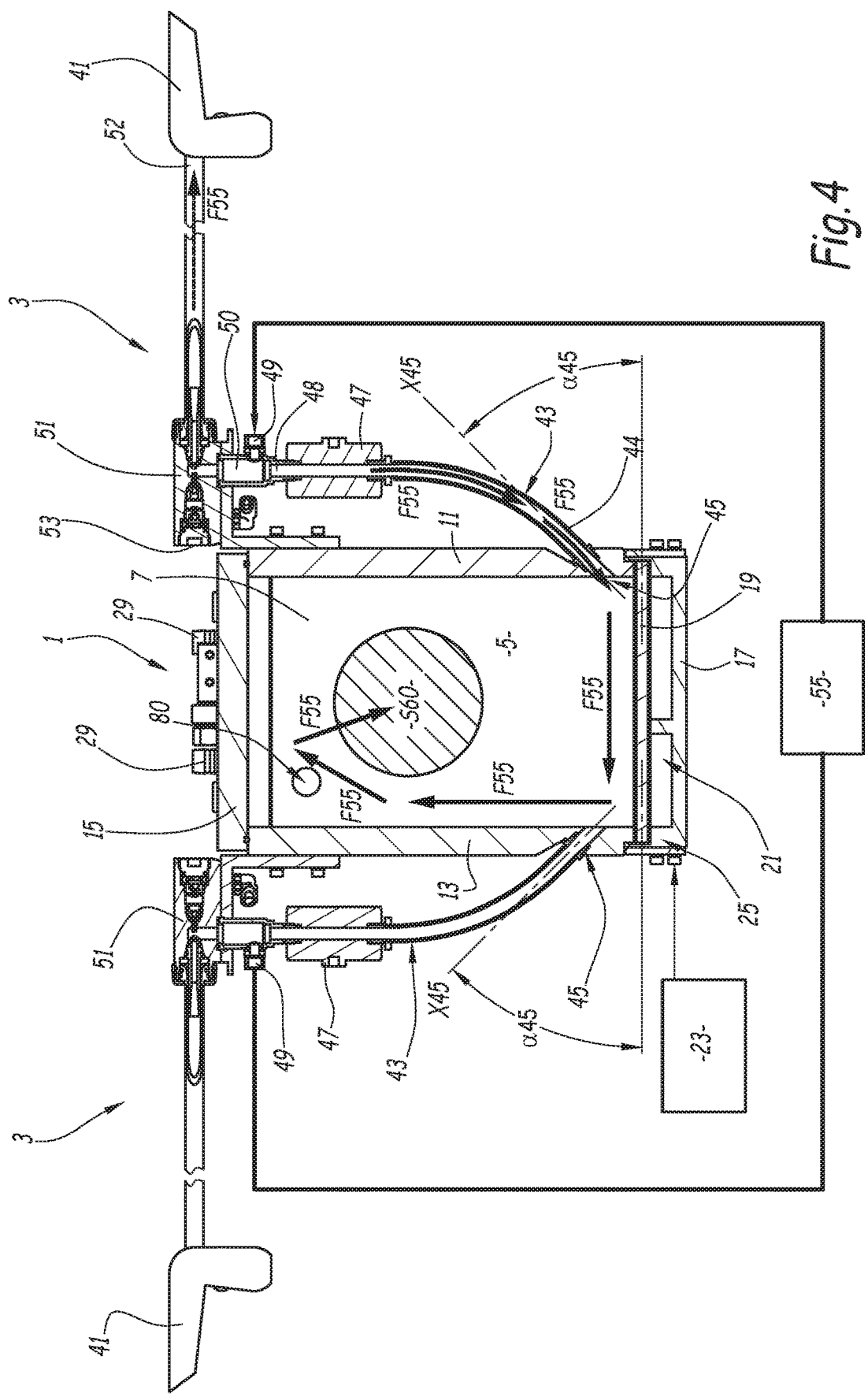

The reservoir 1 comprises a supply chamber 5, visible in FIGS. 2-4, above the plate 19. In the example of the figures, the chamber 5 is delimited by the walls 7, 9, 11, 13 and 15 and by the plate 19, so as preferably to define a generally parallelepiped volume. The chamber 5 is therefore arranged between the opposite side walls 11 and 13, and between the opposite side walls 7 and 9, which delimit the chamber 5 between them. The chamber 5 advantageously constitutes a rigid volume, due to the rigidity of the walls 7, 9, 11 and 15 of the plate 19. The chamber 5 for example defines a volume of between 1 liter and 30 liters, and can have a maximum content of between 1 and 15 kilograms of powder.

The reservoir 1, and in particular the walls 7-17, constitute an airtight and powder-tight closed enclosure, aside from the various inlets and outlets of the reservoir 1 described below. Within the meaning of the invention, each "inlet" and "outlet" for example comprises an orifice or an opening by which a fluid, such as air or powder suspended in the air, can respectively enter or leave an adjacent space.

Preferably, the upper wall 15 is passed through by an access opening, for access to the chamber 5 by a person for maintenance purposes, placing the chamber 5 in communication with the outside of the reservoir 1. The access opening can be closed by a removable cover 27 of the reservoir 1. In the working configuration and the cleaning configuration, this access opening is closed in an airtight manner by the removable cover 27.

In the working configuration, the chamber 5 receives powder to supply sprayers 3 in order to coat the object to be coated. To that end, the reservoir 1 comprises one or several powder inlets 29, which are carried for example by the upper wall 15. Each inlet 29 is connected to a powder supply source of the reservoir 1, which is preferably automatic. Here, two inlets 29 are provided, one being used to admit new powder into the chamber 5, the other being used to admit recycled powder into the chamber 5. "Recycled powder" refers to powder recovered, and optionally treated, after a previous spraying operation on an object. In the working configuration, the powder contained in the chamber 5 is placed in a fluidized state, i.e., placed in suspension, so as to be distributed and set in motion in the volume of the chamber 5. To that end, the plate 19 is a porous fluidization plate. As shown in FIG. 3, from the plate 19, fluidization air F19 is emitted and injected into the chamber 5, so as to be distributed over all or most of the surface of the plate 19.

Preferably, the reservoir 1 delimits a fluidization chamber 21, delimited by the plate 19 and the walls 7, 9, 11, 13 and 17, below the plate 19, within which compressed air is introduced under pressure, so as to pass through the plate 19 to be introduced into the chamber 5 and thus fluidize the powder contained in the chamber 5. The fluidization air is advantageously introduced into the chamber 21 by a compressed air source 23, by means of a fluidization air inlet 25, emerging in the chamber 21, and being arranged through one of the walls of the reservoir 1. The plate 19 is porous to be passed through by the fluidization air F19 and allow its passage from the chamber 21 into the chamber 5. However, the plate 19 is impermeable to the powder contained in the chamber 5, in order to prevent this powder from entering the chamber 21. To that end, the porosity of the plate 19 is smaller than the particle size of the powder.

Due to the fluidization, the chamber 5 and the chamber 21 are under pressure in the working configuration.

As shown schematically in FIG. 1, advantageously, at least one fluidization air outlet 80 is provided through the wall 7. Preferably, two outlets 80 are provided. Each outlet 80 is different from the other inlets and outlets described in this document. Each fluidization air outlet 80 is advantageously connected to a suction system 79 illustrated schematically in FIGS. 1 and 2, by means of a respective valve 81. The valve 81 is preferably a sleeve valve, actuated by a compressed air source.

Preferably, each outlet 80 is connected to the suction system 79, in the working configuration and in the cleaning configuration, which makes the automation easier by avoiding having to connect and disconnect the suction system 79. In the working configuration, each outlet 80 makes it possible to discharge fluidized air introduced into the supply chamber 5 to the system 79. To that end, the sleeve valve 81 is then open. The suction system 79 is designed to discharge, recycle and/or treat the residual powder coming from the chamber 5.

Preferably, a respective cleaning air inlet 82 is also provided, equipping each of these fluidization air outlets 80, outside the reservoir 1. The air inlet 82 makes it possible to introduce cleaning air into the chamber 5, via the orifice formed by the outlet 80. To that end, a cleaning air source 55 is fluidly connected to the air inlet 82. The cleaning inlet 82 for example comprises a fluid coupling, in order to connect a cleaning air pipe supplied by the source 55. The source 55 is advantageously a compressed air source, the compressed air serving as cleaning air.

The air inlet 82 is used in the cleaning configuration and is advantageously not used in the working configuration. If such an inlet 82 is provided, the cleaning inlet 82 is preferably inserted between the sleeve valve 81 and the fluidization air outlet 80. In the cleaning configuration, the cleaning of the chamber 5 can thus be done from each outlet 80, cleaning air being introduced from each inlet 82 into the chamber 5, via each concerned respective outlet 80.

In the cleaning configuration, the respective valve 81 of each outlet 80 is advantageously kept closed, such that cleaning air can be injected toward the chamber 5 through the inlet 82, via the outlet 80.

The cleaning inlet 82 advantageously comprises a gate, closing off the circulation of powder through the cleaning inlet 82 while authorizing the circulation of air. Thus, the gate substantially prevents any rising of powder toward the source 55.

In the cleaning configuration, when one wishes for cleaning air to be introduced only through cleaning inlets other than those described below, the valve 81 can either be closed or open.

The reservoir 1 preferably comprises an outlet 31 for emptying powder contained in the supply chamber 5. The outlet 31 is provided through the plate 19 and is able to conduct the powder from the inside of the chamber 5 to the outside of the reservoir 1. More specifically, the outlet 31 comprises a pipe, passing through the wall 17, the chamber 21 and the plate 19, and opening at one end into the chamber 5, and at the other end outside the reservoir 1. The outlet 31 bears, outside the reservoir 1, a valve 32 in order to be able to be open or closed. In the working configuration and in the cleaning configuration, the outlet 31 is closed. Preferably, the valve 32 is a sleeve valve, actuated by a compressed air source.

The reservoir 1 preferably comprises a vibrator 34, carried by the front wall 7, outside and at the height of the chamber 5.

The reservoir preferably comprises one or several sensors 36, carried by the rear wall 9, in order to determine the powder level in the chamber 5.

The reservoir 1 comprises a discharge opening 60, arranged through the front wall 7 and opening into the supply chamber 5. It will be noted that the opening 60 is different from the other inlets and outlets mentioned in the present document.

The reservoir 1 advantageously comprises a connection coupling 65, here comprising an annular collar 66 and a tubular pipe 67. The tubular pipe 67 is attached to the wall 7 by a first end, so as to surround the opening 60. At its other free end, the tubular pipe 67 bears the collar 66. The collar 66 is provided with orifices for receiving screws or the like, in order to fluidly connect the opening 60 to the suction system 79, as shown schematically in FIGS. 1 and 2. For example, the collar 66 is connected to the suction system 79 via a suction pipe of the suction system 79. Preferably, the opening 60 is connected to the suction system 79, in the working configuration and in the cleaning configuration, which makes it possible to avoid having to connect and disconnect this suction pipe so as to make the automation easier.

As is better visible in FIG. 2, the reservoir 1 comprises a movable plug 61, which goes between a position closing the opening 60, adopted in the working configuration, and an open position of the opening 60, adopted in the cleaning configuration. The plug 61 constitutes a removable stopper. To go between its closed and open positions, the plug 61 advantageously moves in translation along an axis X61 orthogonal to the wall 7. The pipe 67, if it is provided, is advantageously coaxial with the axis X61.

Preferably, the plug 61 assumes a discoid shape, an edge 63 delimiting the opening 60 in turn having a corresponding circular shape, so as to surround and marry the contour of the plug 61, when the plug is in the closing position.

FIG. 2 shows the plug 61 in the closing position. In the open position, the plug is moved along the axis X61 toward the inside of the chamber 5, i.e., in FIG. 2, to the right. Once the open position is reached, the plug 61 is preferably completely inside the chamber 5, whereas in the closed position, the plug 61 is preferably positioned in the plane of the wall 7. Owing to these arrangements, the pressure of the air inside the chamber 5 tends to press the plug 61 toward its closed configuration, which guarantees the tightness of the closure against air and powder.

Preferably, when the plug 61 is moved toward the open position, the plug 61 opens an annular passage delimited between the circumference of the plug 61, with the circular contour, and the circumference of the opening 60, also with the circular contour. In the closing configuration, the plug 61 bears in an airtight and powder-tight manner against the edge 63, constituting a sealing seat, for example a conical bearing centered on the axis X61. In order to obtain a conical bearing, as shown in the figure, it is provided that the contour of the plug is conical, like the contour of the opening 60, which has a complementary conical shape.

In a variant, other complementary shapes can be provided for the plug 61 and the opening 60.

In order to actuate the movement of the plug 61 automatically between its two aforementioned positions, the reservoir 1 advantageously comprises an automatic actuator 69, for example an axial pneumatic jack, which is parallel or coaxial to the axis X61. The position of the plug 61 is therefore modified automatically by the actuator 69, depending on whether the powdering system is in the working configuration or the cleaning configuration. The actuator 69 is advantageously located outside the chamber 5, the plug 61 then being inserted between the actuator 69 and the chamber 5 to protect the actuator 69, in particular in the closing position. The plug 61 is advantageously carried by the actuator 69, by means of a rod coaxial with the axis X61, connecting the actuator 69 to the plug 61.

As shown in FIG. 2, the reservoir 1 preferably comprises one or several cleaning inlets at the opening 60, which assume the form of cleaning nozzles 70. Each nozzle 70 is supplied by a cleaning air source. Preferably, the same cleaning air source 55 as that mentioned above supplies the nozzles 70 with cleaning air.

Each nozzle 70 is arranged by being oriented toward the opening 60, more specifically toward the annular gap formed between the contour of the plug 61 and the seat 63 when the plug 61 is in the open position. Here, the nozzles 70 are arranged between the actuator 69 and the plug 61, along the axis X61. When several nozzles 70 are provided, they are preferably regularly distributed around the axis X61, as shown in FIG. 2. Each nozzle 70 is preferably inclined relative to the axis X61, so as to spray an oblique flow of air, which is therefore both oriented in a centrifugal direction relative to the axis X61 and oriented toward the inside of the chamber 5.

In the present example, the nozzles 70 are movable nozzles. Indeed, the nozzles 70 are fastened to the plug 61 and therefore move jointly with said plug 61, when the plug 61 is movable between the open and closing positions. In the closing position of the plug 61, the nozzles 70 are withdrawn relative to the seat 63, toward the outside of the reservoir 1, along the axis X1, as shown in FIG. 2. In the closing position, the movable plug 61 is inserted between each movable cleaning nozzle 70 and the inside of the supply chamber 5. Thus, in the working configuration where powder in the fluidized state is present in the chamber 5, the movable nozzles 70 are protected from said powder.

When the plug 61 enters the open position, the nozzles 70 are brought to the height of the seat 63, or past the seat 63, along the axis X1, so as to be at least partially positioned inside the chamber 5, when the open position is reached. It is possible to provide that, in the open position, the plug 61 is further forward toward the inside of the chamber 5, such that the nozzles 70 are completely positioned inside the chamber 5. Whatever the selected solution, the movement of the nozzles 70 under the action of the plug 61 makes it possible both, in the cleaning configuration, to extend the blowing zone, and in the working configuration, to protect the nozzles 70.

In the open position, each nozzle 70 can blow cleaning air toward the inside of the supply chamber 5, through the discharge opening 60. Preferably, the blowing of the nozzles 70 is activated automatically when the plug 61 is in the open position, i.e., when the reservoir is in the cleaning configuration.

As is better visible in FIGS. 3 and 4, each sprayer 3 comprises a powder applicator 41. The applicator 41 is arranged outside, and preferably at a distance from, the reservoir 1. For example, the applicator 41 assumes the form of a sprayer or a powder gun, able to be manipulated by hand or by a robot, or which is stationary. In the working configuration, each applicator 41 is able to spray powder toward an object to be coated, in order to coat it with the powder thus sprayed.

For the preferred case of an electrostatic powdering, the powdering system comprises means for applying an electric charge to the powder, these means for example belonging to the applicator 41. The object to be coated is in turn advantageously grounded, or bears a negative electric charge, such that the powder, sprayed by the applicator 41 against the object, is attracted by Coulomb force and adheres to this object. Preferably, the object thus coated with powder is next passed through a furnace, in particular to cause a permanent adhesion of the powder to the object by polymerization.

Preferably, the portion of the powder that has not coated the object is recovered in order to be reintroduced into the reservoir 1 as recycled powder, after possible treatments such as filtering, via one of the inlets 29.

Each sprayer 3 comprises a supply line 43, connecting the applicator 41 to a respective supply outlet 45 of the supply chamber 5. It will thus be understood that the sprayers 3 are connected to the chamber 5 by individual outlets 45. If a single sprayer 3 is provided, a single outlet 45 is provided. It will be noted that the outlets 45 are separate from the outlet 31. More specifically, as shown in FIGS. 2-4, each outlet 45 defines an outlet orifice that passes through one of the two side walls 11 or 13. Each outlet orifice is generally cylindrical, coaxial with an orifice axis X45. Each orifice axis X45 is inclined relative to the fluidization plate 19, by an angle a45 of between 30° and 60°, ideally between 45° and 55°. In FIGS. 2-4, the angle is 50°.

In the event there are multiple sprayers 3, like in the figures, each outlet 45 is advantageously provided through one of the side walls 11 and 13. Each wall 11 and 13 advantageously includes several outlets 45, and thus supplies several sprayers 3. Preferably, an equal number of sprayers 3 is connected to the chamber 5 via the wall 11 and via the wall 13, each wall 11 and 13 bearing an equal number of outlets 45. In other words, a first portion of the outlets 45 is provided through the side wall 11 and a second portion of the outlets 45 is provided through the side wall 13.

Each outlet 45 is arranged closer to the fluidization plate 19 than the upper wall 15. In practice, the outlets 45 are placed as close as possible to the plate 19. Preferably, each outlet orifice 45 is located at a distance smaller than 50 mm, for example smaller than 25 mm, from the fluidization plate. On each wall 11 and 13, the outlets 45 are distributed from the wall 7 to the wall 9, preferably regularly. As better shown in FIG. 2, here, each wall 11 and 13 receives a plurality of outlets 45 arranged in a row parallel to the plate 19. This arrangement makes it possible for the entire area of the chamber 5 containing powder to be able to supply the sprayers 3, with no area of the chamber 5 where powder could not be recovered by the sprayers 3.

In the working configuration, each applicator 41 is supplied with powder contained in the supply chamber 5 means of the outlet 45 by means of its respective supply line 43, by to which the line 43 is connected.

Each line 43 advantageously comprises a valve 47, which is preferably directly connected to the outlet 45 of this line 43 by a pipe 44, without bypass, belonging to the line 43. The valve 47 makes it possible to open and close the line 43. In other words, the valve 47 moves between an open configuration, in which the valve 47 allows the supply of the applicator 41 with powder contained in the chamber 5, by means of the supply line 43, and a closed configuration, in which the valve 47 prohibits the supply of the applicator 41 with powder contained in the chamber 5, by means of the supply line 43. In the working configuration, each valve 47 makes it possible to choose whether the applicator 41 that is connected thereto can or cannot be supplied with the powder coming from the chamber 5, the valve 47 closing or opening the line 43. Preferably, each valve 47 is a sleeve valve, actuated by a compressed air source.

Each line 43 preferably comprises a cleaning inlet 49, which is advantageously directly connected to the valve 47 by a pipe 48, without bypass, belonging to the line 43, such that the valve 47 is fluidly inserted between the inlet 49 and the outlet 45. The cleaning inlet 49 is used in the cleaning configuration, but preferably is not used in the working configuration. The cleaning air source 55 is fluidly connected to the supply line 43 via the cleaning inlet 49. It may involve the same cleaning air source as for the inlets 70 and/or 82, or a second, separate cleaning air source. The cleaning inlet 49 for example comprises a fluid coupling, in order to connect a cleaning air pipe supplied by the source 55.

The cleaning inlet 49 can be described as "line cleaning inlet" even if its cleaning action is not necessarily limited to the line 43 to which the inlet 49 belongs.

The cleaning inlet 49 advantageously comprises a porous filter, closing off the circulation of powder through the cleaning inlet 49 while authorizing the circulation of air. Thus, the porous filter substantially prevents any rising of powder toward the source 55. Preferably, the porous filter is made from a porous material, and for example assumes the form of a tube made from a porous material. The porous filter, in particular its porous material, has a porosity smaller than the particle size of the powder, preferably smaller than 50 µm (micrometers), for example smaller than 30 µm.

As illustrated in FIG. 4 by the arrows F55, in the cleaning configuration, the source 55 circulates cleaning air, preferably under pressure, from certain inlets 49, into the chamber 5. To reach the chamber 5 from one of the inlets 49, the cleaning air circulates via the pipe 48, via the valve 47, if such a valve 47 is provided inserted between the inlet 49 and the outlet 45, via the pipe 44 and via the outlet 45. Cleaning air reaches the chamber 5 only if the valve 47 is in the open configuration.

FIG. 4 shows a case where cleaning air is injected only through the inlets 49 located on the right in FIG. 4, i.e., from lines 43 attached to the wall 11. In this situation, the air circulates in the chamber 5 along a spiral trajectory, so as in particular to sweep over the plate 19 and the side wall 13 opposite said wall 11. The circulation of cleaning air in the chamber 5 is very turbulent, such that the cleaning is particularly effective. The residual powder is necessarily dislodged from the outlets 45 and valves 47, which are directly on the path of the cleaning air circulating in the line

43. The outlets 45 advantageously being oriented on an incline toward the plate 19, the cleaning air strikes the plate 19 with force, near each outlet 45 supplied by cleaning air.

The cleaning air thus circulated loosens, and carries with it, residual powder contained in the various elements of the powdering system that the air, thus circulated, passes through. In particular, the chamber 5 is cleaned, as well as the outlets 45 and the valves 47.

Each line 43 advantageously comprises a pump 51, which is advantageously directly connected to the cleaning inlet 49 by a pipe 50, without bypass, belonging to the line 43. Another pipe 52, without bypass, belonging to the line 43, connects the pump 51 to the applicator 41. Thus, the pump 51 is fluidly inserted between the inlet 49 and the applicator 41. In the working configuration, upon command by a user or a logic controller, as shown in FIG. 3, the pump 51 suctions the powder contained in the chamber 5 via the outlet 45 and sends it toward the applicator 41 via the pipe 52. In FIG. 3, the path of the powder thus circulated by the pump 51 is shown by the arrows F51.

For each line 43, the circulation of the powder is possible when the valve 47 is in the open configuration. In other words, the pump 51, in the working configuration of the powdering system, circulates powder contained in the chamber 5 up to the applicator 41, by means of the supply line 43 of this pump 51. The pump 51 provides enough kinetic energy to the powder to obtain the spraying thereof outside the applicator 41. The pump 51 is advantageously a Venturi effect pump, comprising at least one compressed air supply inlet 53, for its operation.

In the cleaning configuration, when the source 55 injects cleaning air through the inlet 49, it is possible to provide that the valve 47 is in the closed configuration, such that the cleaning air is circulated into the applicator 41, via the pipe 50, the pump 51 and the pipe 52, as shown by the arrow in dotted lines in FIG. 4. The cleaning of the portion of the projector 3 extending into the applicator 41 is then particularly effective.

In the cleaning configuration, it is also possible to provide that the valve 47 is in the open configuration, such that the cleaning air is circulated not only into the applicator 41, by means of the pipe 50, the pump 51 and the pipe 52, but also into the chamber 5, by means of the pipe 48, the valve 47, the pipe 44 and the outlet 45. A complete cleaning of the line 43 is then done, advantageously with a greater effectiveness on the chamber 5 side than on the applicator 41 side.

More generally, the valve 47, the cleaning inlet 49, the pump 51 are each fluidly inserted, along the line 43, between the applicator 41 and the outlet 45. The valve 47, the cleaning inlet 49, the pump 51 and the applicator 41 are connected in series, successively one after the other, along the line 43.

When, in the cleaning configuration, cleaning air is circulated toward the supply chamber 5 from one or several of the inlets 49, 70 and/or 82, the residual powder is transported by the cleaning air outside the reservoir 1, in particular outside the chamber 5, via the opening 60, the plug 61 of which is then in the open position. It is then advantageous to provide that the suction system 79 is connected to the outlet 60. Inasmuch as, in the cleaning configuration, a significant quantity of cleaning air is circulated through the chamber 5, it is preferable to provide that the opening 60 is large. As shown by crosshatching in FIG. 4, in the open configuration of the plug 61, the discharge opening 60 defines a cleaning air passage section S60, preferably delimited by the contour of the opening 60 and in a plane orthogonal to the axis X61. Likewise, as shown in FIG. 2, each cleaning inlet 49, 70 and 82 defines a cleaning air passage section. Each of these passage sections is delimited by the contour of the opening of the cleaning inlet in question. The area of the section S60 is advantageously greater than the sum of the areas of the sections of all of the cleaning inlets 49, 70 and 82. Preferably, the area of the section S60 is more than two times greater than the sum of the areas of the sections of all of the cleaning inlets 49, 70 and 82. The section S60 being large, the expulsion of the residual powder outside the chamber 5 is made easier, since the chamber 5 can be subjected to a very significant cleaning air flow rate.

In the cleaning configuration, the cleaning air can be injected through all of the inlets 49, 70 and 82 at the same time, or through only some of the inlets 49, 70 and 82, or sequentially, i.e., by modifying the set of inlets 49, 70 and 82 supplied with cleaning air over time. For example, when cleaning air is introduced through the nozzles 70 after a phase for injecting cleaning air through the inlets 49, the cleaning air creates a new turbulent flow of air to complete the cleaning of the supply chamber 5. Whatever the case may be, this cleaning air is suctioned by the suction system 79 via the opening 60.

Preferably, a single compressed air source, grouping together the sources 23 and 55, supplies air in different parts of the powdering system selectively and automatically. This single compressed air source for example supplies all or some of the following elements: the valve 32, the valves 47, the cleaning inlets 49, 70 and 82, the pumps 51, the chamber 21 and the actuator 69. For example, this single compressed air source comprises a compressed air generator and a network of compressed air pipes connected to the generator and to the different parts of the powdering system, in order to selectively supply these parts of the powdering system with the compressed air thus generated. To select the parts of the powdering system to be supplied, the network of pipes comprises a set of air distributors and pumps, as well as a logic controller controlling the set of distributors and pumps.

In a variant, it has been seen that separate compressed air sources can supply the different parts of the powdering system. In this case, each air source can for example supply a group of parts of the powdering system, for example a group made up of all of the inlets 49, or group made up of all of the inlets 49, 70 and 82. In particular, if the cleaning air must have a composition different from that of the compressed air supplying the other parts, in particular for the fluidization of the powder or the supply of the pumps 51, it is for example possible to distinguish a cleaning air source and one or several sources of air intended for the other functions of the powdering system. In this variant, each compressed air source comprises, for example, an air generator for cleaning and a network of compressed air pipes connected to the generator and to the various affected air inlets of the powdering system, via their respective connector. To select the air inlet(s) to be supplied, the network of pipes comprises a set of air distributors and pumps, as well as a logic controller controlling the set of distributors and pumps.

The aforementioned powdering system is configured to implement a cleaning method, when the cleaning system is in the cleaning configuration. In this cleaning method, the cleaning is done according to an automatic program, where the inlets 49, 70 and/or 82 are supplied in a predetermined manner, and optionally variable over time. For example, it is possible to provide for supplying, in turn, the inlets 49 of the sprayers 3 connected to the wall 11, then the inlets 49 of the sprayers 3 connected to the wall 13, and vice versa. For example, it is possible to provide for supplying, in turn, each inlet 49, or groups of inlets 49, sequentially, according to a predetermined order. Thus, the cleaning air flows generated in the chamber 5 can be modulated and modified throughout the cleaning, or can be made more turbulent by quickly changing the set of inlets 49, 70 and/or 82 admitting cleaning air. The cleaning is therefore improved.

In a variant that is not illustrated, all or some of the cleaning nozzles 70 are stationary relative to the wall 7. To that end, these stationary nozzles are attached to a stationary part of the reservoir 1, at the opening 60, i.e., near or through this opening. For example, each stationary nozzle is attached to the pipe 67, the wall 7 or the edge of the opening 60. Preferably, the stationary nozzles are placed outside the chamber 5, so as to blow cleaning air from the outside of the chamber 5 toward the inside of the chamber 5, when the plug 61 is in the open position. Also in this case, when the plug 61 is in the closed position, the plug 61 is advantageously inserted between the stationary nozzles and inside the chamber 5.

Any feature of an embodiment or a variant defined hereinabove can be implemented for the other embodiments and variants defined hereinabove.

The invention claimed is:

1. A powdering system, having a working configuration and a cleaning configuration, comprising:
    a powder reservoir, comprising a supply chamber receiving powder;
    at least one sprayer, comprising:
        a powder applicator, and
        a supply line, connecting said powder applicator to a respective supply outlet of said supply chamber, such that, in the working configuration, said powder applicator is supplied with powder contained in said supply chamber by means of the supply line; and
    at least one cleaning inlet, fluidly connected to said supply chamber such that, in the cleaning configuration, a cleaning air supply source is connected to the at least one cleaning inlet so as to circulate cleaning air in said supply chamber;
wherein said powder reservoir comprises:
    a discharge opening, arranged through a wall of said supply chamber and opening into said supply chamber; and
    a movable plug, which is movable between:
        a closing position where the plug is positioned in the plane of the wall of said supply chamber and closes said discharge opening, the closing position being adopted in the working configuration, and
        an open position where the plug is positioned inside the supply chamber and opens said discharge opening, the open position being adopted in the cleaning configuration such that the circulation of cleaning air in said supply chamber through said at least one cleaning inlet causes a discharge of residual powder contained in said supply chamber through said discharge opening, to an outside of said supply chamber.

2. The powdering system according to claim 1, wherein:
    said discharge opening defines a cleaning air passage section;
    each of said at least one cleaning inlet defines a cleaning air passage section; and
    an area of the cleaning air passage section of said discharge opening is greater than a sum of areas of each said cleaning air passage section of each of said at least one cleaning inlet.

3. The powdering system according to claim 2, wherein the area of said cleaning air passage section of said discharge opening is at least two times greater than the sum of the areas of each said cleaning air passage section of said at least one cleaning inlet.

4. The powdering system according to claim 1, wherein said at least one cleaning inlet comprises at least one stationary cleaning nozzle, arranged at said discharge opening while being stationary relative to the wall, said at least one stationary cleaning nozzle being designed to blow cleaning air coming from the supply source from the outside of said supply chamber, toward the inside of said supply chamber, through said discharge opening.

5. The powdering system according to claim 1, wherein said at least one cleaning inlet comprises at least one movable cleaning nozzle, attached to said movable plug so as to be securely movable with said movable plug, said at least one movable cleaning nozzle being designed to blow cleaning air toward the inside of said supply chamber, through said discharge opening.

6. The powdering system according to claim 5, wherein:
    from the closing position to the open position, said movable plug is moved toward the inside of said supply chamber; and
    in the closing position, said movable plug is inserted between each said movable cleaning nozzle and the inside of said supply chamber.

7. The powdering system according to claim 5, wherein, in the open position of said movable plug, each said movable cleaning nozzle is at least partially positioned inside said supply chamber.

8. The powdering system according to claim 1, wherein the wall is a vertical wall of said powder reservoir.

9. The powdering system according to claim 1, further comprising a suction system to which said discharge opening is fluidly connected, to thus discharge residual powder contained in said supply chamber toward the suction system, through said discharge opening, when, in the cleaning configuration, cleaning air is circulated in said supply chamber through said at least one cleaning inlet.

10. The powdering system according to claim 1, wherein said powder reservoir comprises an automatic actuator, automatically positioning said movable plug in the closing position, when the powdering system is in the working configuration, and in the open position, when the powdering system is in the cleaning configuration.

11. The powdering system according to claim 1, wherein said powder reservoir comprises:
    a fluidization plate, delimiting said supply chamber, the fluidization plate emitting, in the working configuration, fluidization air of the powder contained in said supply chamber; and
    at least one fluidized air outlet arranged through the wall, which is configured to discharge fluidization air in the working configuration, said at least one cleaning inlet equipping said at least one fluidized air outlet in order, in the cleaning configuration, to circulate cleaning air toward said supply chamber through said at least one fluidized air outlet.

12. The powdering system according to claim 11, wherein said powder reservoir comprises:
    an upper wall, said supply chamber being delimited by the upper wall and by said fluidization plate; and
    at least one side wall, connecting said upper wall to said fluidization plate and bearing the respective supply outlet of said at least one sprayer, the respective supply outlet being arranged closer to said fluidization plate than the upper wall.

13. The powdering system according to claim 12, wherein the respective supply outlet of said at last one sprayer is located at a distance smaller than 50 mm from said fluidization plate.

14. The powdering system according to claim 12, wherein the respective supply outlet defines a respective outlet orifice passing through the side wall, the outlet orifice defining an orifice axis that is inclined relative to said fluidization plate, by an angle of between 30° and 60°.

15. The powdering system according to claim 12, wherein:

said at least one side wall comprises a first side wall and a second side wall that are opposite one another, delimiting said supply chamber between them; and for each of said sprayers, said supply line of the sprayer connects said powder applicator of the sprayer to a respective supply outlet of said supply chamber, a first portion of the supply outlets being provided through said first side wall, a second portion of the supply outlets being provided through said second side wall.

16. The powdering system according to claim 11, wherein said powder reservoir comprises an emptying outlet for emptying powder contained in said supply chamber, the emptying outlet passing through said fluidization plate.

17. The powdering system according to claim 1, wherein:

said supply chamber comprises at least one inlet for allowing powder into said supply chamber; and said at least one cleaning inlet comprises a line cleaning inlet belonging to said supply line of said at least one sprayer, the line cleaning inlet being arranged between said powder applicator and the supply outlet, such that, in the cleaning configuration, for each sprayer, the cleaning air source can be connected to the line cleaning inlet to circulate cleaning air towards said powder applicator and towards said supply chamber, via the supply line.

18. The powdering system according to claim 17, wherein each said line cleaning inlet comprises a filter by means of which the cleaning air is injected into the supply line, the filter having a pore size smaller than the particle size of the powder.

19. The powdering system according to claim 18, wherein the filter has a pore size smaller than 50 μm.

20. The powdering system according to claim 17, wherein, for each said sprayer, said supply line comprises a valve, arranged between the supply outlet and said line cleaning inlet, the valve moving between:

an open configuration, in which the valve allows the circulation of cleaning air coming from said line cleaning inlet toward said supply chamber and toward said powder applicator, and a closed configuration, in which the valve prohibits the circulation of cleaning air coming from said line cleaning inlet toward said supply chamber, while allowing the circulation of cleaning air coming from the line cleaning inlet toward said powder applicator via said supply line.

21. The powdering system according to claim 17, wherein, for each said sprayer:

said supply line comprises a pump, arranged between said powder applicator and said line cleaning inlet, and said pump, in the working configuration of the powdering system, circulates powder contained in said supply chamber up to said powder applicator, by means of said supply line.

* * * * *